United States Patent [11] 3,600,510

[72] Inventors Joseph R. Owen
Orlando;
John J. Kulik, Winter Park, both of, Fla.

[21] Appl. No. 838,128
[22] Filed July 1, 1969
[45] Patented Aug. 17, 1971
[73] Assignee The United States of America as represented by the Secretary of the Navy

[54] CLOSE VIEWING TV FOR SIMULATORS
1 Claim, 2 Drawing Figs.

[52] U.S. Cl. .......... 178/6.8, 315/13
[51] Int. Cl. .......... H04n 7/18
[50] Field of Search .......... 178/6.8, 6 TM, 6.5; 313/69, 70, 13; 315/13

[56] References Cited

UNITED STATES PATENTS

| | | | |
|---|---|---|---|
| 2,165,028 | 7/1939 | Blumlein .......... | 315/13 |
| 3,046,331 | 7/1962 | Gebel .......... | 178/6.8 |
| 3,499,982 | 3/1970 | O'Neal, Jr. .......... | 178/6.8 X |

*Primary Examiner*—Robert L. Griffin
*Assistant Examiner*—Richard K. Eckert, Jr.
*Attorneys*—Joseph C. Warfield, John W. Pease and J. F. Miller

ABSTRACT: The number of lines in a television raster is increased to remove a raster visible on a television tube screen at close viewing distances without a concomitant increase in complexity of apparatus. One gun of a two-gun cathode-ray display tube receives a video signal. The second gun receives the video signal delayed. The scanning lines generated by the two guns on the display screen are controlled by sweep voltages in such manner that the lines are interleaved and the horizontal sweep of one beam is delayed an amount proportional to the video delay.

Joseph R. Owen
John J. Kulik
INVENTORS
BY John F. Miller
Agent
John M. Perry
Attorney

CLOSE VIEWING TV FOR SIMULATORS

STATEMENT OF GOVERNMENT INTEREST

The invention described herein may be manufactured and used by or for the Government of the United States of America for governmental purposes without the payment of any royalties thereon or therefore.

BACKGROUND OF THE INVENTION

The invention is in the field of television. In many of the prior art television display devices, the construction of the apparatus is such that an observer's eye is necessarily positioned very close to the screen of the cathode-ray display tube. At short distances, the eye readily resolves the lines of a 1,029 line television raster. The appearance of the raster on the TV screen detracts from the effectiveness of the apparatus in many instances. One example is that of television-type training devices where a student observer looks at a scene presented on a TV display tube. The appearance of a raster has been found to be distracting and generally detrimental to the effectiveness of the training device. Many expedients have been tried to eliminate the raster. For example, a two-gun CR tube and two TV cameras, one to furnish a video signal to each respective gun, have been tried. This has not proven satisfactory for several reasons, among them being the fact that two cameras cannot be located in the same space simultaneously to scan the same scene from one location. Alignment problems in such an arrangement are severe. A straightforward engineering approach has been tried, but to increase the number of lines using this expedient requires a proportionate increase in the horizontal deflection frequency, with a resulting deterioration in horizontal resolution. Additionally, the bandwidth of the video amplifiers must be increased proportionately with concomitant complications. If, for example, the viewing distances involved were such that it were necessary to double the number of lines in the 1,019 line raster to 2,038 lines, it would be necessary to double the bandwidth of the video amplifier. Amplifiers of the requisite bandwidth are not currently available. Applicants have solved this problem of the prior art by inventing means to increase the number of lines in a TV raster without materially adding to the complexity of the apparatus.

SUMMARY OF THE INVENTION

A single video signal is fed to one gun of a two-gun cathode-ray display tube. The video signal is delayed and fed to the other gun of the cathode-ray tube. The sweep circuit voltages are such that the raster lines traced by one gun are interspersed between the lines traced by the other gun with a delay proportional to the video delay. The net effect is a doubling of raster lines and disappearance of the raster visible on a one-gun tube.

DESCRIPTION OF THE PREFERRED EMBODIMENT

Figure 1:
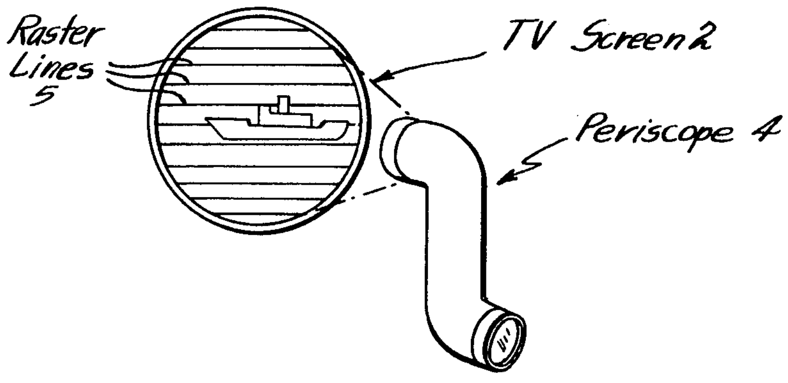
FIG. 1 shows raster lines on a TV display tube.

In FIG. 1 is shown one example of a television-type training device wherein a television display tube screen 2 is observed by a student through a periscope 4. Due to the construction of the training device, the distance between the objective of the periscope and the screen is necessarily small.

It has been found that a student observer viewing screen 2 through periscope 4 is distracted by the appearance of raster lines 5 on the screen. Raster lines 5 detract from the scene shown on the screen and the student's ability to concentrate on the problem at hand. This results in deterioration of the total training effect achieved with the training device.

The appearance of scanning raster lines when the television screen is viewed from short distances is attributable to the visual acuity of the human eye. The raster lines 5 seen on screen 2 can be made to disappear by increasing the number of lines in a raster, thus effectively lessening the distance between lines, or increasing the distance between the screen and the eye. Both alternatives are impracticable for a number of reasons. Increasing the screen to eye distance is impracticable because of field of view limitations. Increasing the number of raster lines by means of the skill of the prior art would require a vast increase in the cost and complexity of the TV system.

Figure 2:
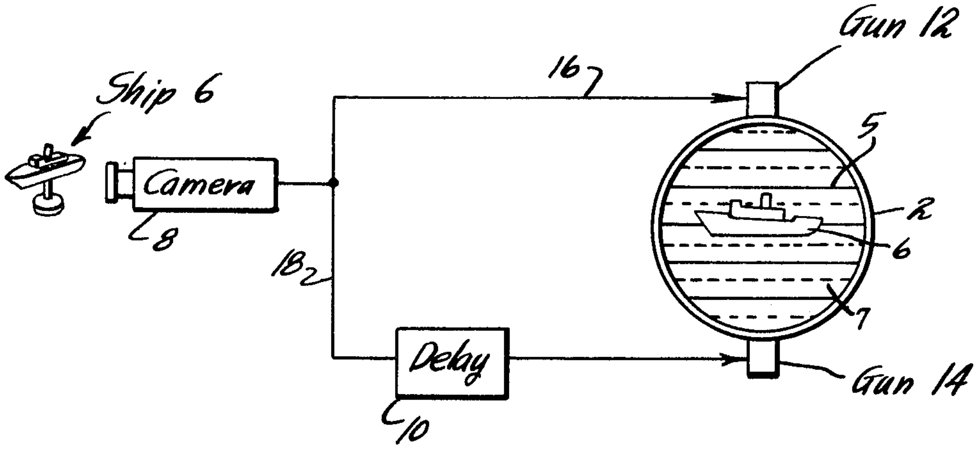
FIG. 2 shows the invention.

Referring now to FIG. 2, the invention is shown in the environment of a typical training device. Here a TV camera 8 scans a scene comprising, for example, a model ship 6, and forwards video information over a lead 16 to a gun 12 which is generating an electron beam appearing on TV screen 2 as raster lines 5. The video information from camera 8 is also fed over a lead 18 through a delay 10 to a second gun 14 which generates an electron beam which traces raster lines 7 on the TV screen 2. Raster lines 7 are shown as dotted lines to distinguish them from raster lines 5 generated by gun 12. The arrangement of elements shown in FIG. 2 is not necessarily accurate but is arranged to illustrate the function of the invention. The sweep circuits of the system are arranged so that raster lines 5 are midway between adjacent raster lines 7. Two adjacent lines 5 and 7 are traced simultaneously because the beams from guns 12 and 14 are driven by paralleled sweep circuits to avoid any misregistration which might be caused by distortion. However, the sweep circuits are adjusted so that the beam from gun 12 leads the beam from gun 14 in a horizontal direction by a small distance to avoid any possibility of beam interference. The delay 10 delays the video signal from camera 8 an amount sufficient to compensate for the horizontal displacement of the electron beams.

The net result of the described arrangement is that the number of raster lines is effectively doubled. This reduces the raster line spacing to a point where the eye cannot resolve the lines at a practicable viewing distance. Thus, in the training device illustrated the raster will not detract from the scene presented to the student observer. This results in a considerable enhancement of the training effect.

The invention is shown in a training device environment by way of example, but has utility in any application where the appearance of a TV raster is undesirable. For example when a large screen TV is placed in a small room the viewing distances are necessarily small and a raster is often observable on the screen. Applicants' invention is a simple and economical solution to the raster problem.

We claim:

1. In a television system, the improvement comprising:
a television camera for developing a video signal,
a cathode-ray tube,
said cathode-ray tube having a screen and two electron beam guns located therein,
each of said electron beam guns being adapted to be controlled to trace a respective separate and distinct raster on said screen,
said rasters each being comprised of a plurality of horizontal scanning lines, the horizontal scanning lines generated by one gun being interlaced with the horizontal scanning lines generated by the other gun, the scanning arrangement being such that the separate and distinct rasters are not superimposed, the scanning spot generated by one beam being horizontally displaced with respect to the scanning spot generated by the other beam a distance sufficient to avoid interference,
a first line connecting the video output terminal of said camera to a first of said electron beam guns whereby the signal level of the beam developed by said first gun is controlled by the video signal developed by said camera,
a second line connecting the video output terminal of said camera to said second electron beam gun whereby the signal level of the electron beam developed by said second electron gun is controlled by the video signal developed by said camera, and delay means connected in said second line between said camera and said second electron beam gun to delay said video signal for a time proportional to the horizontal displacement of the scanning spots generated by said electron beams, whereby the scanning raster visible under adverse conditions is caused to disappear.